(No Model.)
C. ROBERTS.
HAND CAR BRAKE.
No. 446,715. Patented Feb. 17, 1891.
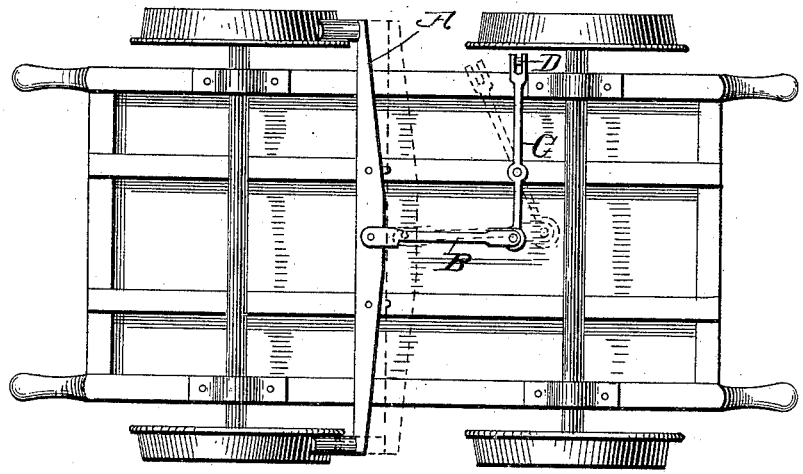
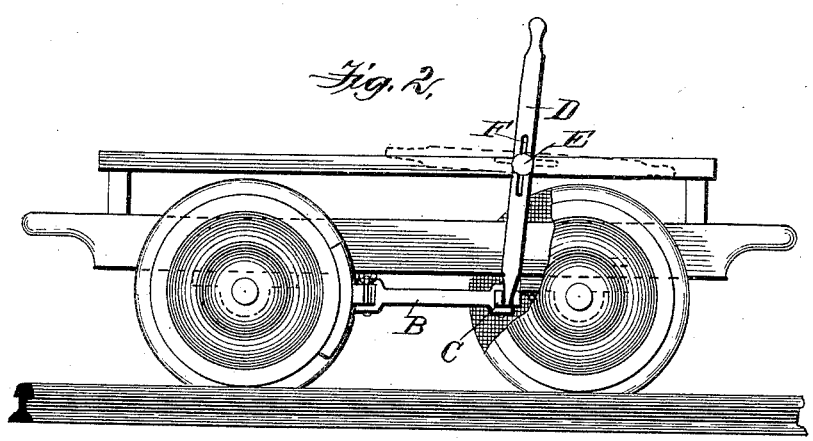
Witnesses
F. W. Cornwall
L. S. Bacon
Inventor
Cyrus Roberts
By Thos. S. Sprague & Son
Attys

UNITED STATES PATENT OFFICE.

CYRUS ROBERTS, OF THREE RIVERS, MICHIGAN.

HAND-CAR BRAKE.

SPECIFICATION forming part of Letters Patent No. 446,715, dated February 17, 1891.

Application filed July 26, 1890. Serial No. 359,971. (No model.)

*To all whom it may concern:*

Be it known that I, CYRUS ROBERTS, a citizen of the United States, residing at Three Rivers, in the county of St. Joseph and State of Michigan, have invented certain new and useful Improvements in Hand-Cars, of which the following is a specification, reference being had therein to the accompanying drawings.

This invention relates to new and useful improvements in brake mechanism for hand-cars; and the object of the invention is especially to provide brake mechanism adapted to that class of hand-cars which are built with a special view of being propelled as push-cars, and in which provision is made to disconnect or remove the handles for the purpose of disclosing the sides of the car to permit of loading or unloading. The ordinary brake mechanism of hand-cars is not available for this class of cars, as it would defeat the object for which the hand-cars have been constructed.

The object of my invention is to supply such a brake which has the same features of folding out of the way as the propelling-levers.

To this end my invention consists in the construction and arrangement of the different parts, as hereinafter more fully described, and shown in the accompanying drawings, in which—

Figure 1 is a plan view of a hand-car provided with my brake mechanism, and Fig. 2 is a side elevation thereof with the lever shown in both positions, the dotted one being the position in which it is folded out of the way.

A is a brake-beam suspended transversely below the car by suitable links, free to swing backward and forward. A central connecting-rod B pivotally connects it with one end of the lever C, which projects to one side of the car, where it engages with the lower end of the brake-lever D. This is pivotally secured to the side of the car in proximity to the reach of the workmen propelling the car, and it is detachably secured to the lever C in any suitable manner, such as by engaging its lower end loosely into an aperture formed in the free outer end of the lever C. The pivot E of the brake-lever passes through a slot F in the brake-lever, all so arranged that by propelling the lever D its lower end will be disengaged from the lever C and then it will be freed by falling out of the way, the preferable way being to fold rearwardly, where it will rest on the car-wheel, or, better, drop between the wheel and the side of the brake, from either position of which it may be readily recovered and placed back in operative position, and in either position of which it is also out of the way for loading and unloading the car.

My brake-lever and mechanism may be applied to either the front or rear wheels, as deemed desirable.

I do not limit myself to the peculiar construction of car-brake shown, as the spirit of my invention consists in the construction and arrangement of brake-lever provided with the feature of folding out of the way.

What I claim as my invention is—

1. In brake mechanism for hand-cars, substantially as described, a brake-lever pivotally secured to the side of the car, and means for disengaging said brake-lever from its brake mechanism and folding it to the side of the car, substantially as described.

2. In brake mechanism for hand-cars, the brake-lever D, having a pivotal sliding connection on the side of the car, substantially as described.

In testimony whereof I affix my signature in presence of two witnesses.

CYRUS ROBERTS.

Witnesses:
 M. B. O'DOGHERTY,
 JAMES WHITTEMORE.